United States Patent [19]
Plakas

[11] 3,963,615
[45] June 15, 1976

[54] MULTIFILTRATION UNIT

[76] Inventor: Chris J. Plakas, 8510 Conover Place, Alexandria, Va. 22308

[22] Filed: Oct. 31, 1974

[21] Appl. No.: 519,621

[52] U.S. Cl. ............................ 210/203; 210/323 T; 210/406
[51] Int. Cl.² ........................................ B01D 35/02
[58] Field of Search .......... 210/323, 406, 238, 232, 210/203; 23/259, 292

[56] References Cited
UNITED STATES PATENTS

| | | | |
|---|---|---|---|
| 3,319,792 | 5/1967 | Leder et al. | 210/323 X |
| 3,730,352 | 5/1973 | Cohen et al. | 210/406 X |

*Primary Examiner*—Frank A. Spear, Jr.

[57] ABSTRACT

A multifiltration unit operated by pressure and/or vacuum and accommodating simultaneously in separate sealed chambers a number of disposable filter holders. The unit has a single cover with self-tightening means.

4 Claims, 3 Drawing Figures

MULTIFILTRATION UNIT

BACKGROUND OF THE INVENTION

1. Field of the Invention

The present invention relates to a filtration system, and more specifically to a system for simultaneous filtration of multiple samples through application of pressure and/or vacuum sources.

2. Description of the Prior Art

A variety of sampling systems utilizing disposable filter holders for simultaneous filtration of multiple samples are available for laboratory and field applications in such areas as amino acid studies, gravimetric analyses, radiological assays, and oceanographic research. These sampling systems have traditionally employed vacuum sources for operation, rather than pressure sources, due to the fact that pressure systems have required heavier mechanical construction, increased preparation and maintenance time and have been potentially hazardous due to pressure build-up. However, pressure operation does allow for greater selectivity in types of sample medium filtered and permits quantitative recovery of residues or filtrates, thus making the development of an improved pressure system highly desirable.

SUMMARY OF THE INVENTION

The present invention provides a filtration system that offers pressure operation as a practical alternative to vacuum operation. By introducing a means for reducing pressure build-up by more than half, the instrument weight, maintenance and operation time, and potential hazards are also reduced, thus providing a more versatile filtration system. The present invention provides a filtration system offering both pressure and vacuum sources for simultaneous filtration of multiple samples. The invention also provides a lightweight portable filtration unit that is free from the hazards normally associated with pressure build-up. The invention also provides a means for self-tightening of the pressure cover of the unit by its own operation pressure.

DESCRIPTION OF THE PREFERRED EMBODIMENTS

Figure 1:
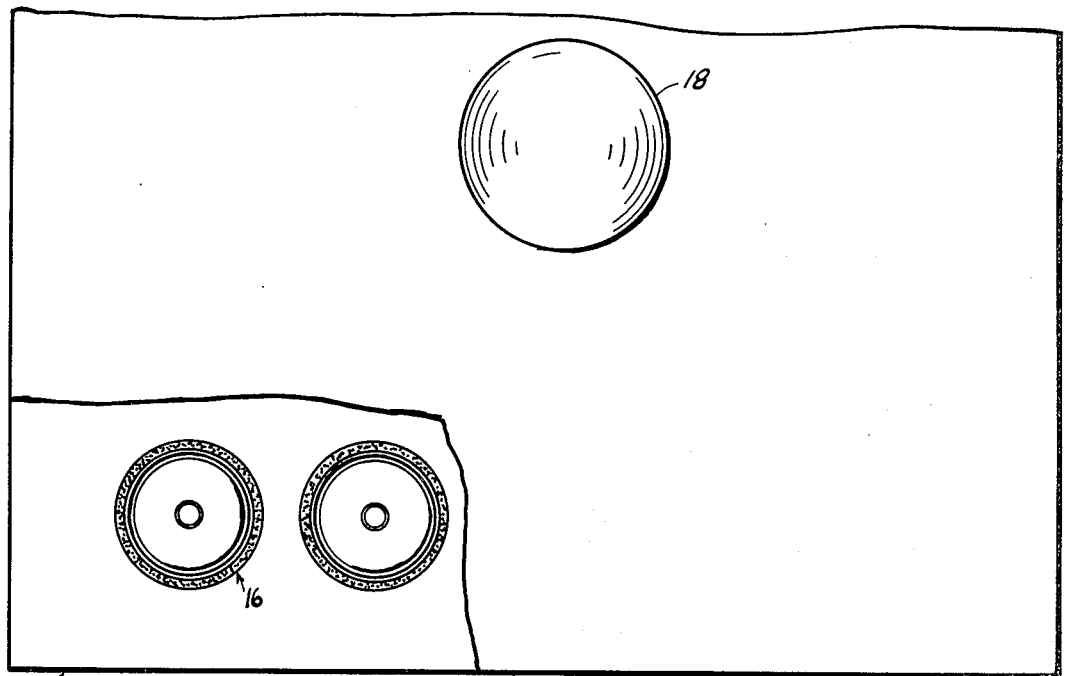
FIG. 1 is a top view of the filtration system.
Figure 2:
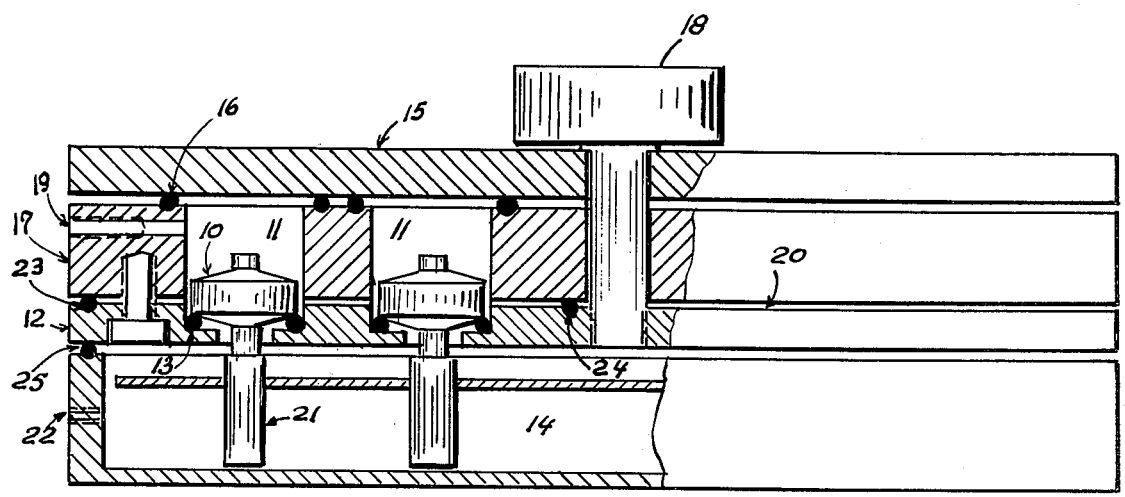
FIG. 2 is a cross sectional view of the filtration system.
Figure 3:
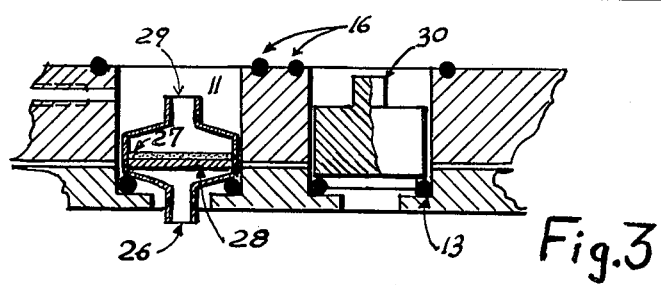
FIG. 3 is a cross sectional view showing a filter holder with filter and showing a plug in chambers of the device.

In the preferred form of embodiment, the filtration system according to the invention comprises in combination: a chamber plate 17 containing multiple pressure chambers 11, a support plate 12 accommodating disposable filter holders 10, a vacuum chamber 14 that can accommodate test tubes 21 for filtrate recovery, a pressure cover 15 with a special knob-screw 18 for self-tightening, o-ring sealing means 13, 16, 23, 24, and 25, and pressure supply fitting 19 and vacuum supply fitting 22. The disposable filter holders 10 are inserted in pressure chambers 11, where they rest on the support plate 12. Plate 12 is sealed by means of o-rings 13 from the vacuum chamber 14. The filter holder 10 is a plastic case separated by a membrane filter 27 and membrane support 28. The sample is introduced through the opening 29. The residue is retained on the filter membrane 27. The filtrate drains through the opening 26. When the number of filter holders 10 used in the filtering operation is less than the total number of available chambers 11, the plug 30, as shown in FIG. 3, which may be made of any rigid material, serves to temporarily seal the unused chambers 11. After the sample or samples are applied to filters in the filter holders 10, the pressure cover 15 is fitted over pressure chambers 11, which are individually sealed by o-rings 16 when the cover 15 and the chamber plate 17 are tightened together by the knob-screw 18. Air pressure, which is introduced through supply fitting 19, circulates freely from chamber to chamber through an under-cut space 20 and forces the filtrate through filters in the filter holders 10 into the vacuum chamber 14, where the filtrate may be collected in individual test tubes 21. Pressure exerted within the system during normal pressure operation exerts two equal forces. The upward force is distributed on two surfaces, those of the chamber plate 17 and the cover 15, while the downward force is exercised only on the surface of support plate 12, thus deflecting the support plate 12 downward because it is thinner than the other plates. Since knob-screw 18 is mounted on the support plate 12, the knob-screw is also pulled downward, forcing the pressure cover 15 and the chamber plate 17 to remain securely sealed.

For vacuum operation, the pressure cover 15 may be removed and vacuum is applied through vacuum supply fitting 22. Chamber 14 is always used at low pressure, but may or may not have a vacuum applied.

What is claimed is:

1. A device for simultaneously filtering a plurality of separate samples on a corresponding plurality of filters, comprising:
   A. a chambered plate having a plurality of chambers in a pattern therein,
   B. a support plate adapted to be fitted under the chambered plate comprising a plurality of recessed means for mounting disposable filter holders therein in a corresponding pattern,
   C. a pressure cover adapted to be fitted over the chambered plate,
   D. a low pressure chamber adapted to be fitted under the support plate for receiving filtrate from the plural filter holders,
   E. first sealing means fitted between the chambered plate and the pressure cover for separately sealing off each of the plurality of chambers at its end adjacent to the pressure cover,
   F. means for fitting together adjacent sides of the chambered plate and the support plate, thereby separating from the ambient air an upper chamber comprising all of said plurality of chambers and interconnecting undercut spaces,
   G. second sealing means in each of the plurality of recessed means for mounting filter holders for sealing each recessed means when a filter holder or plug is inserted therein, thereby preventing flow of air between the upper chamber and the low pressure chamber except through the filters,
   H. removable manual means for tightening the support plate, the chambered plate and the pressure cover into a tightly sealed sandwich for use on top of the low pressure chamber,
   I. means for introducing pressurized air into the upper chamber, and J. means for removing air from the low pressure chamber.

2. A device according to claim 1 further comprising means for holding a plurality of test tubes within the low pressure chamber to collect the filtrate separately from the corresponding filter holders.

3. A device according to claim 1 wherein the means for removing air consists of a vacuum fitting into the low pressure chamber.

4. A device according to claim 1 wherein the means for removing air consists of an opening to atmospheric pressure.

* * * * *